Figure 1:
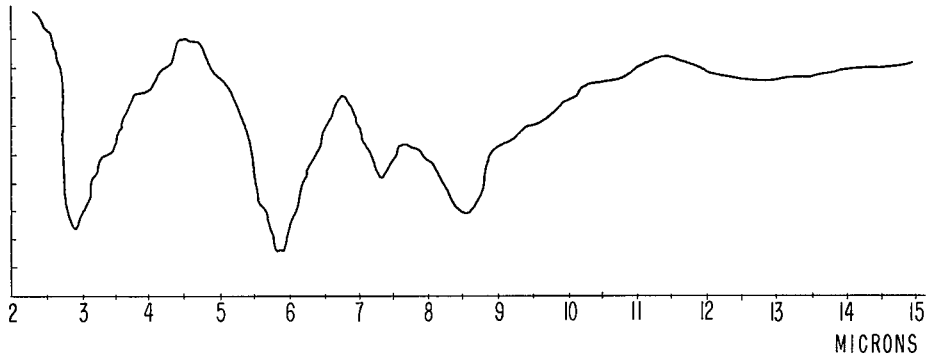

Nov. 16, 1965  P. PIGANIOL  3,218,298
POLYMALEIC ACID AND ALKALI AND ALKALINE EARTH METAL SALTS
OF SAID ACID AND PROCESS OF MAKING SAME
Filed May 3, 1962

INVENTOR.
PIERRE PIGANIOL
BY Bauer and Seymour
ATTORNEYS 3,218,298
POLYMALEIC ACID AND ALKALI AND ALKA-
LINE EARTH METAL SALTS OF SAID ACID AND
PROCESS OF MAKING SAME
Pierre Piganiol, Paris, France, assignor to Compagnie de
Saint-Gobain, Neuilly-sur-Seine, France
Filed May 3, 1962, Ser. No. 192,222
Claims priority, application France, May 4, 1961, 860,730
10 Claims. (Cl. 260—78.4)

This invention relates to a new group of industrial products, polymaleic acid and the alkali and alkaline earth metal salts of that acid. The invention also includes a process for the manufacture of these new compounds.

Polymaleimide used according to the invention as the raw material from which the new compounds are made is known and can be prepared by polymerizing maleimide by the method described in French Patent No. 1,248,070. N-substituted polymaleimides can also be prepared by known methods and these N-substituted compounds in which the substituent is an alkyl radical can also be used as raw materials in the production of new compounds by the new method.

It is an object of this invention to prepare polymaleic acid and its salts of alkali and alkaline earth metals by a novel process.

The objects of the invention as to process are accomplished, generally speaking, by a method of making polymaleic acid which comprises hydrolyzing a compound from the class of polymaleimides, and N-substituted polymaleimides having alkyl substituents. The novel compositions of matter have a plurality of interconnected units of the formula

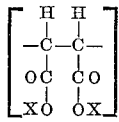

in which X is one of the group consisting of H and a metal from the class of alkali and alkaline earth metals.

According to the invention the hydrolysis of the raw material may be carried out in acid medium using a strong mineral acid, a process which produces polymaleic acid directly. The hydrolysis may equally be effectuated in alkaline medium by the use of an alkali or alkaline earth metal hydroxide, which will produce alkali or alkaline earth salts of polymaleic acid. If it is desired to obtain the acid these salts may be treated with a strong acid to liberate and polymaleic acid.

The hydrolysis in acid medium is effectuated according to the reaction

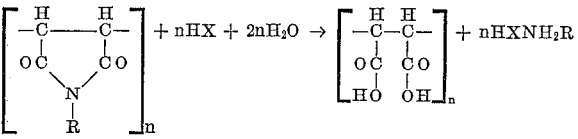

in which R represents hydrogen or an alkyl radical and X represents an electronegative group; $n$ is a numeral greater than 1.

The hydrolysis in alkaline medium follows the reaction

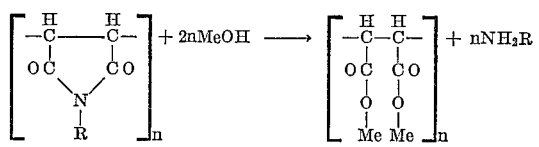

in which R is hydrogen or alkyl; Me is an alkali metal; or by the reaction

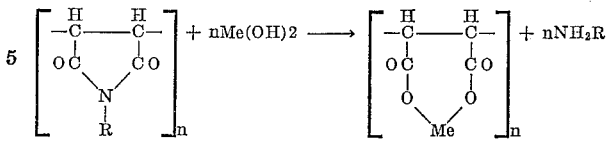

in which R is hydrogen or alkyl, and Me is an alkaline earth metal.

In formulas 2 and 3 $n$ is a numeral greater than 1. When the products of reactions 2 and 3 are acted upon by a strong mineral acid polymaleic acid is produced. In order to carry out the hydrolysis in acid medium polymaleimide, substituted or not, is suspended in an aqueous solution of a strong mineral acid such as hydrochloric or sulfuric, the solution having a concentration of about 2 to about 30 grams of acid to 100 grams of water. The mass is heated to boiling for a time varying between 20 and 100 hours according to the concentration of the acid. The solution is finely filtered to eliminate the unreacted raw material. The separation of polymaleic acid and ammonium and amine salt from the mineral acid is carried out by microscopic filtration (dialysis) and the last traces of cations are eliminated by cation exchange resins of standard type.

The hydrolysis in alkaline medium is carried out on unsubstituted polymaleimide by suspending it in water and slowly adding at room temperature stoichiometric proportions of an alkali or alkaline earth metal hydroxide, such as the hydroxide of lithium, sodium, potassium, calcium, barium, in water solution. The ammonia which forms is driven off the water is evaporated under vacuum on the water bath. One recovers the salt as a solid, breaks it up and dries it in an oven under vacuum at 50° C. If one wishes to obtain polymaleic acid itself one adds an excess of 5 to 10% of alkali metal or alkaline earth metal hydroxide to accelerate the hydrolysis and then adds a strong mineral acid to disintegrate the salt and eliminate polymaleic acid.

If one uses an N-substituted polymaleimide the process of hydrolysis in alkaline medium may be slightly modified to take into consideration the fact that the hydrolysis is slower because of the stiffer nature of the polymer. This is overcome by adding soluble organic softening agents to the water; these should be inert to alkali hydroxides or alkaline earth hydroxides and may include alcohols, glycols, polyols, polyvinyl alcohol, and if necessary the salts of fatty acids. The substituted polymaleimide is suspended in an aqueous mixture of the softening agent and of a hydroxide of an alkali or alkaline earth metal, such as lithium, sodium, potassium, calcium or barium in stoichiometric proportions with respect to the substituted polymaleimide; a small excess rather than stoichiometric proportions may be employed if the pure salt is an essential. A red colored suspension is formed by the production of an intermediate compound and this suspension is heated to a temperature high enough to permit the hydrolysis and liberation of the amine which has been formed. The solution loses the color produced, during this heating. When there is no longer a release of amine the decolored solution is evaporated under vacuum on the water bath, producing the polymaleate, which is broken up and dried in a vacuum oven at 50° C. Where vacuum is mentioned the vacuum of an aspirator is generally sufficient.

To obtain the free polymaleic acid the alkali and alkaline earth maleates are added in small fractions at ordinary temperature to the solution of a volatile strong acid such as hydrochloric acid in stoichiometric proportions with agitation. When the alkaline earth salt of the strong acid is insoluble it is removed by filtration and the polymaleic acid is extracted by evaporation of the solution under vacuum. When the salt of the strong acid is soluble the solution obtained, constituted by polymaleic acid and alkali or alkaline earth salts, is removed by filtration. The removal of polymaleic acid from the salt of the strong acid is carried out by dialysis and the last traces of cations are eliminated by the use of resinous ion exchangers of cations. The solution which comes from the ion exchangers is evaporated under vacuum to isolate the polymaleic acid in dry state.

Polymaleic acid is a yellowish powder, of which the molecular weight is a function of the molecular weight of the polymaleimide constituting the raw material.

The accompanying drawings show the absorption spectrum of polymaleic acid in the infra-red. The tests were made with dry polymaleic acid which had been finely divided, mixed with finely divided potassium bromide, and made into a paste with water. To furnish a basis of comparison there has been applied to the same diagram the infra-red absorption spectrum of maleic acid and succinic acid taken under identical conditions.

Figure 2:
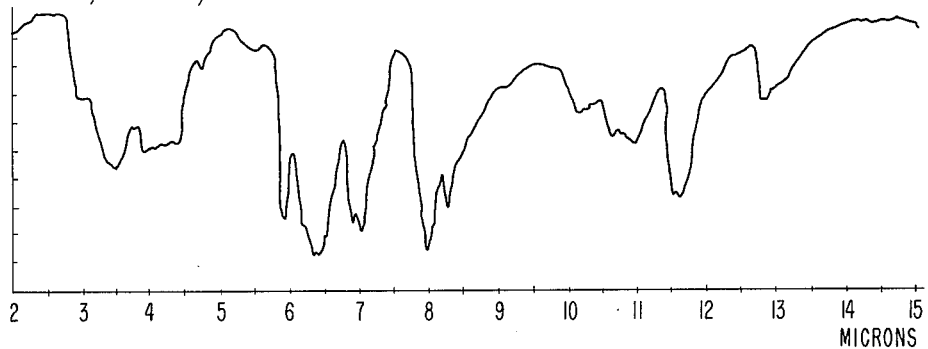
Figure 3:
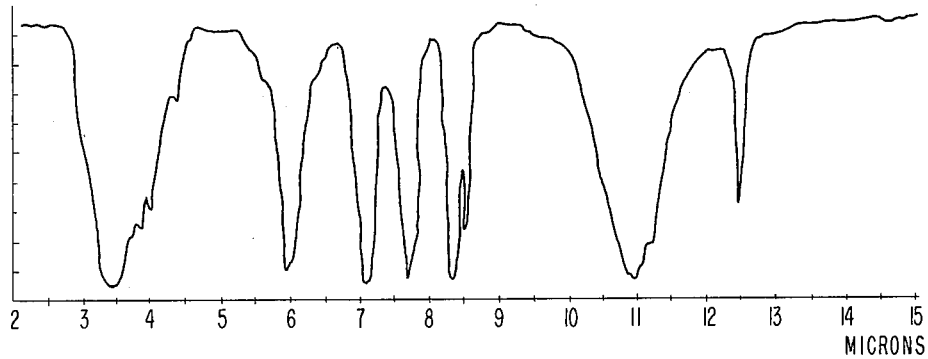

FIG. 1 is the absorption spectrum of polymaleic acid;
FIG. 2 is the absorption spectrum of maleic acid;
FIG. 3 is the absorption spectrum of succinic acid.

The infra-red spectrum of polymaleic acid compared to maleic acid and to succinic acid shows by the width of its bands that it concerns an amorphous polymer containing numerous acid groups characterized by bands 3 mu, corresponding to the vibration O—H, 5 mu 9 corresponding to the vibration C=O, and 8 mu 5 characteristic of acids. The polymaleic acid as well as its alkali and alkaline earth salts, when excited by ultra-violet rays, even those close to the visible spectrum such as ray 3650 A. of the mercury spectrum, have stable and brilliant luminescense displaced toward the long wave lengths with respect to the exciting light, the color and intensity of this luminescence being related to the number of groups COOH which have been metalized (which may also be none), and from the nature of the cation. The luminescence, which is very strong in the solid state, persists in solution, even in very dilute solution, especially in the case of the lithium salt. The phenomenon of instantaneous emission is accompanied by a strong differential emission of which the duration, after the end of the excitation, varies with the temperature. This is of long duration at low temperature, for instance −180° C.; but its duration is substantial at room temperature, being observable for several seconds to the naked eye in shadow, for instance, in the case of lithium salts. The color of the differential emission is not the same as that of the instantaneous emission. The mean wave length is greater.

The polymaleic acid obtained by the novel reactions may contain an even or an uneven number of identical chain links of the formula

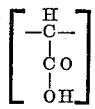

The compounds which had an uneven number of links are conveniently made by subjecting the polymaleic acid produced as aforesaid to mechanical treatment or to the action of alpha, beta or gamma rays. The mechanical treatment may be carried out by passing the polymaleic acid several times between the cylinders of a roll mill, or by submitting a solution of polymaleic acid to high internal stress by flowing it through a narrow space separating two concentric cylinders which rotate with respect to each other and not together. The treatment with rays can be carried out by any known means such as by X-rays or radio-cobalt.

Some of the polymaleate salts such as the polymaleates of sodium and potassium are quite microscopic, while others such as lithium polymaleate are not.

The new compounds are useful in industry; for instance they can be used to buffer certain cations against their usual reactives, they can be used as ion exchange resins, they are used in aqueous solution as thickeners, and as suspension stabilizers. They can be used as luminescent agents in the solid state or they may be incorporated in transparent plastic materials for excitation by ultra-violet rays approaching the visible spectrum, or as modifying agents of photographic emulsions by using their power of affecting the spectral sensitivity of the emulsion. The hydroscopic salts from this group are dehydrating agents. Furthermore, by incorporating them in certain mixtures they prevent desiccation in the same way that the polyols do. The buffering of cations is also called complexation and to accomplish it the new products are put into the solution containing the cations which become masked and can no longer be precipitated by the usual precipitants. For example the salts of calcium can be masked in boiler water so that they do not precipitate, thereby markedly reducing the frequency with which such boilers must be cleaned. In the presence of this masking agent the cations do not precipitate as insoluble salts. In the case of boilers the calcium carbonate does not form.

The following examples illustrate the invention but are not to be deemed to be limitations of the generalities elsewhere herein stated.

*Example 1*

Preparation of polymaleic acid. In a flask surmounted by a refrigerated reflux condenser, there were introduced 9.7 grams of polymaleimide and 25% of its weight of sulfuric acid dissolved in 80 cc. of water. The mixture was heated at boiling for 30 hours. The unreacted polymaleimide was filtered off, leaving a solution of polymaleic acid and ammonium sulfate. This solution was purified by dialysis, being placed in a cellulose membrane which was immersed in distilled water undergoing magnetic agitation. The distilled water was continuously renewed about the membrane until it no longer dissolved ammonium sulfate. The material in the membrane was then mixed with cation exchange resins of the type called Amberlite IR 120. After desiccating the solution 1 gram of a yellowish powder of intense blueish luminescence was obtained. The half life of the slow luminescence was several seconds at −180° C. The cellulose membrane used in this particular example was regenerated cellulose.

*Example 2*

Preparation of sodium polymaleate. 30 grams of polymaleimide was suspended in 450 cm.$^3$ of water and placed in a receptacle and agitated magnetically very slowly over a period of about 5 hours; there was added to the receptacle drop by drop 123 cm.$^3$ of 5 N caustic soda. The reaction mass was evaporated under vacuum on the water bath and 200 cm.$^3$ of water were added and evaporated again to dryness. This operation was repeated 4 times. The product no longer smelled of ammonia. The product was removed, broken up, and dried under vacuum in an oven at 50° C., producing 50 grams of a luminescent product which was very hydroscopic, and contained a small quantity of COONH$_4$ (30% nitrogen), of which the infra-red spectrum established its composition as that of sodium polymaleate.

*Example 3*

Preparation of potassium polymaleate. Operating as in Example 2 with 10 grams of polymaleimide in 150 cm.$^3$ of water to which there was additionally added 41 cm.$^3$ of 5 N caustic potash, there was produced 17.5 grams of a luminescent, hydroscopic product which was identified as potassum polymaleate.

*Example 4*

Preparation of lithium polymaleate. Operating as in Example 2 with 10 grams of polymaleimide in 150 cm.$^3$ of water to which 113 cm.³ of a solution of lithium hydroxide of 4.36% concentration had been added, there was produced 14 grams of a luminescent, non-hydroscopic product which was identified as lithium polymaleate.

*Example 5*

Preparation of sodium polymaleate from poly (methylmaleimide). A flask received 11 grams of poly (methylmaleimide) and 8 grams of caustic soda in 100 cm.³ of a mixture of alcohol and water, 50/50, producing a suspension of red color at room temperature there was a release of methylamine. The mass was agitated until there was no further release and there was thus obtained a luminescent, colorless solution which was evaporated to dryness on the water bath under vacuum. The resulting product was broken up and dried under vacuum in an oven at 50° C. producing 15.5 grams of the same product as that of Example 2.

*Example 6*

Preparation of polymaleic acid from sodium polymaleate. 116 grams of water and 116 grams of 22° Bé. HCl were placed in a receptacle and agitated magnetically. To this was added in very small fractions 93.5 grams of sodium polymaleate until all had been dissolved. The dissolving can be accelerated by moderate heating. The solution was filtered and the water was evaporated under vacuum on the water bath. Another 200 cm.³ of water was added and evaporated. The product extracted from the receptacle was broken up and dried under vacuum at 50° C., producing 119 grams of a yellow powder which was luminescent and contained some sodium chloride. It was purified by dialysis and by passage over ion exchange resins. The product was yellowish and had a more intense luminescence than that of Example 5.

These products are new and useful and the process of preparing them is satisfactory for commercial operation. The differential luminescence of which we spoke hereinabove is also called slow luminescence and its presence in organic material for any substantial time (several seconds) is unusual. Luminescence is initiated by exposing the material to ultra-violet light. With organic substances it is known to end when the exciting light is turned off. These new polymers are organic but they continue luminescence for several seconds after the end of the excitation. This is extremely useful in luminescent light tubes because the luminescence of the tube does not end with reversal of the alternating current but maintains the luminescence of the tube during the period of change and eliminates the disagreeable effects which were heretofore characteristic of such tubes. The half life of the slow luminescence is the time after the end of excitation at which the luminescence has diminished by one half.

As many apparently widely different embodiments of the present invention may be made without departing from the spirit and scope thereof, it is to be understood that the invention is not limited to the specific embodiments.

What is claimed is:

1. A method of making polymaleic acid which comprises hydrolyzing a compound from the class consisting of the polymaleimides and N alkyl substituted polymaleimides by boiling it under reflux with a strong mineral acid.

2. In the process of making one of the group consisting of polymaleic acid and its alkali and alkali metal salts from a compound of the class consisting of the polymaleimides and N alkyl substituted polymaleimide, the steps of hydrolyzing the said compound in aqueous medium in contact with a reagent from the class consisting of a strong mineral acid and the hydroxides of alkali and alkaline earth metals.

3. A method of making the alkali metal and alkaline earth salts of polymaleic acid which comprises hydrolyzing a compound from the class of polymaleimide and N substituted polymaleimides in alkaline medium by means of a metal hydroxide from the class of alkali and alkaline earth metals.

4. A method of making polymaleic acid which comprises mixing polymaleimide with a strong mineral acid, refluxing the reaction mass, and isolating and drying the polymaleic acid.

5. A method of hydrolyzing polymaleimides which comprises mixing the polymaleimide in water and slowly adding thereto a hydroxide of a metal of the classes of alkali and alkaline earth metals.

6. A method of hydrolyzing an N substituted polymaleimide which comprises mixing the polymaleimide in aqueous alkaline medium containing a wetting agent inert to alkali and alkali earth hydroxides, with a hydroxide of the alkali and alkali earth metals.

7. A method of making polymaleic acid which comprises mixing polymaleimide with about 25% of its weight of sulphuric acid in aqueous solution, boiling the mixture under reflux, filtering, isolating the solution of polymaleic acid by dialysis, removing cations from the solution, and drying the solution.

8. A method of making a metal salt of polymaleic acid which comprises suspending a polymaleimide in water, adding a hydroxide of the class of alkali and alkaline earth metal, extracting the ammoniacal content of the mass, and drying the mass.

9. A method of preparing a polymaleic acid which is luminescent upon exposure to external energy which comprises refluxing a mixture of polymaleimide and sulfuric acid, filtering off the unreacted polymaleimide, purifying the filtrate by dialysis in contact with a membrane which in turn is in contact with agitated water, mixing the residual solution from dialytic extraction with a cation exchanger, and isolating and drying the product.

10. A method of preparing a alkali metal polymaleate which is luminescent upon exposure to external energy which comprises suspending polymaleimide in aqueous medium adding a metal hydroxide from the class consisting of alkali and alkaline earth hydroxides thereto, repeatedly watering the product and evaporating it to dryness under vacuum at water bath temperature, dividing it, and drying it under vacuum at about 50° C.

References Cited by the Examiner

UNITED STATES PATENTS

| | | | |
|---|---|---|---|
| 2,294,226 | 8/1942 | D'Alelio | 260—32 |
| 2,301,356 | 11/1942 | Arnold et al. | 260—78 |

FOREIGN PATENTS 731,052 6/1955 Great Britain.

OTHER REFERENCES

Conant: "The Chemistry of Organic Compounds," published by the MacMillan Co., New York, 1959.

JOSEPH L. SCHOFER, *Primary Examiner.*